J. ROBERTSON.
Slaughter-House and Apparatus.
No. 222,952. Patented Dec. 23, 1879.
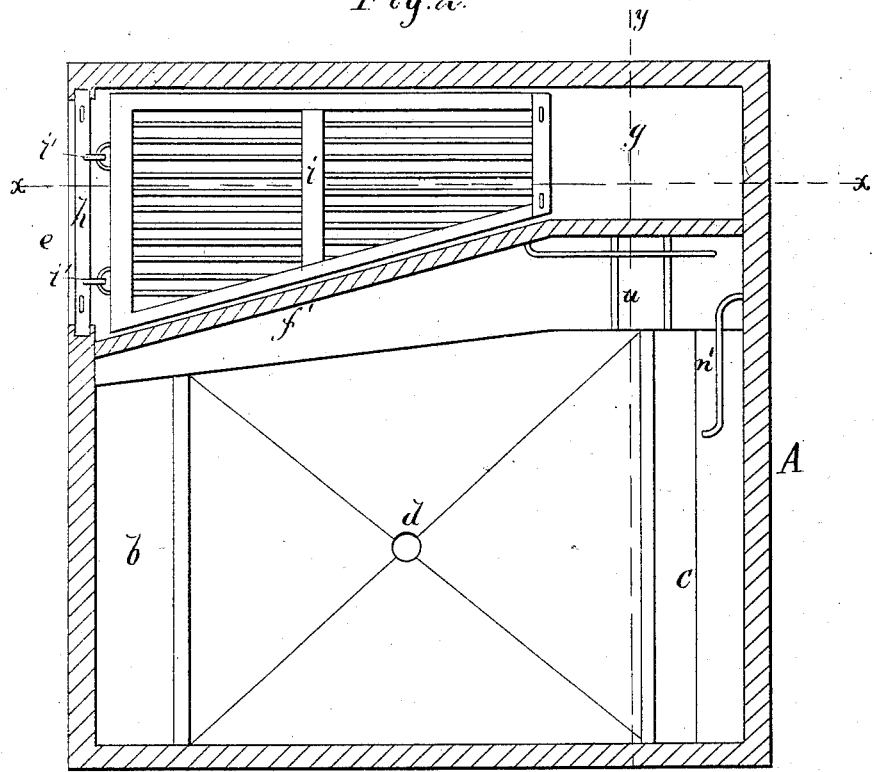
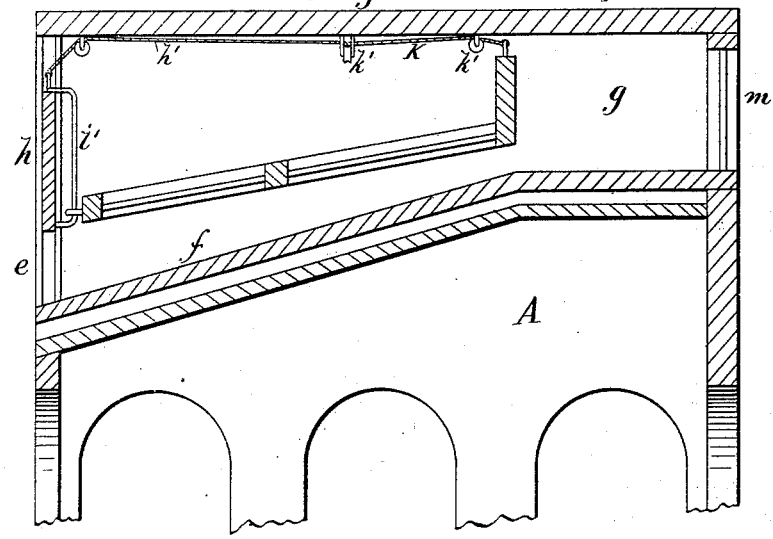
WITNESSES:
Henry N. Miller
C. Sedgwick
INVENTOR:
J. Robertson
BY Munn & Co
ATTORNEYS.

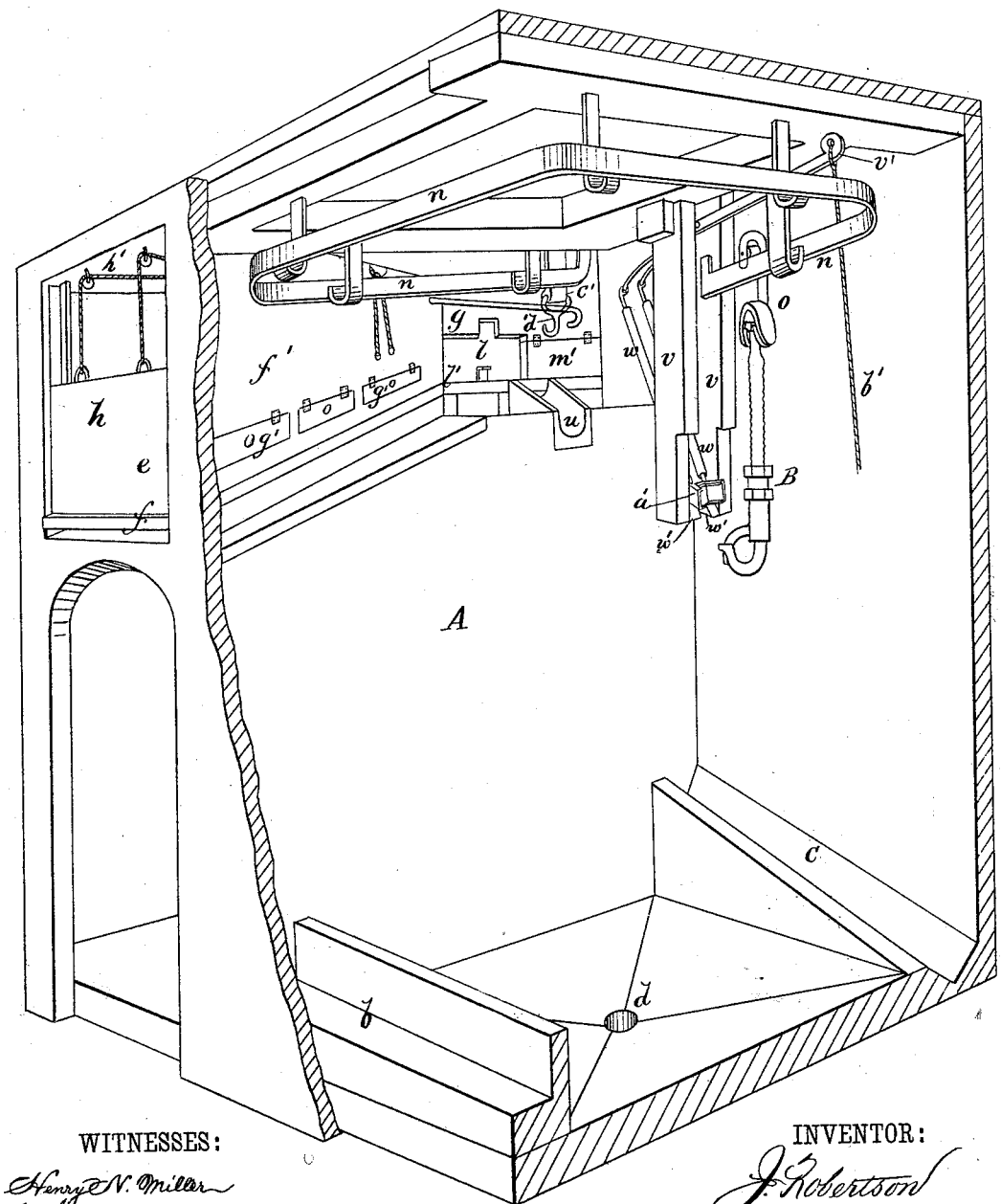

3 Sheets—Sheet 3.

J. ROBERTSON.
Slaughter-House and Apparatus.

No. 222,952. Patented Dec. 23, 1879.

WITNESSES:
Henry N. Miller
C. Sedgwick

INVENTOR:
J. Robertson
BY Munn & Co.
ATTORNEYS.

N. PETERS, PHOTO-LITHOGRAPHER, WASHINGTON, D. C.

UNITED STATES PATENT OFFICE.

JAMES ROBERTSON, OF EAST CAMBRIDGE, MASSACHUSETTS, ASSIGNOR TO HYLARD & CO., OF SAME PLACE.

IMPROVEMENT IN SLAUGHTER HOUSES AND APPARATUS.

Specification forming part of Letters Patent No. 222,952, dated December 23, 1879; application filed September 15, 1879.

*To all whom it may concern:*

Be it known that I, JAMES ROBERTSON, of East Cambridge, in the county of Middlesex and State of Massachusetts, have invented a new and useful Improvement in Slaughter Houses and Apparatus, of which the following is a specification.

The object of my invention is to furnish an improved system of and apparatus for slaughtering animals for food, whereby the work may be done with greater facility and economy than heretofore, and the degrading tendencies of the business to those engaged in it will be largely reduced.

In my apparatus I utilize the fact that all animals used for food are shorter in the fore legs than in the hind legs, and it is therefore easier for them to ascend than descend a grade, by driving the animals up an inclined plane to an elevated pen, from which they are removed one by one and carried downward by gravity during the successive operations required in slaughtering.

I make use of a hook of novel construction, which is to be caught above the fetlock of the animal and attached to a rolling truck on a descending track, so that the suspended animal is carried from the pen around the interior of the building until the end of the track is reached, where the hook is disconnected by automatic action. These features I will describe more particularly with reference to the accompanying drawings, wherein—

Figure 4:
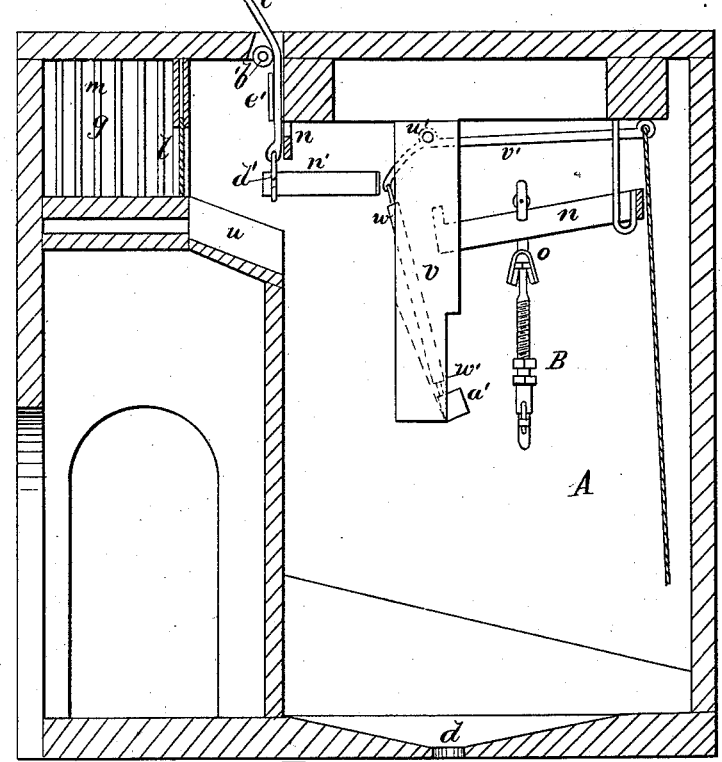
Figure 7:
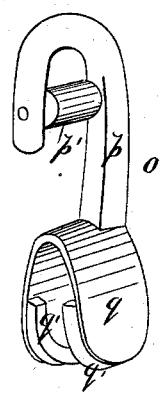
Figure 5:
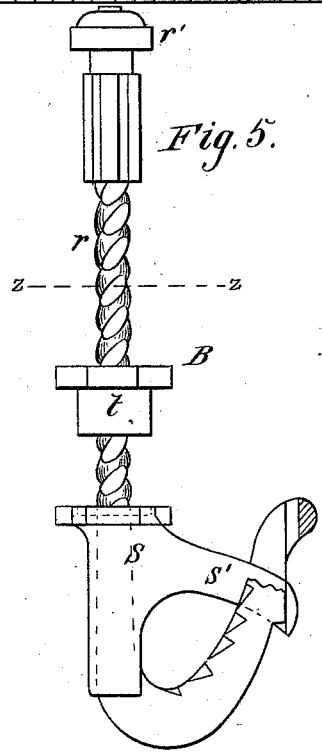
Figure 6:
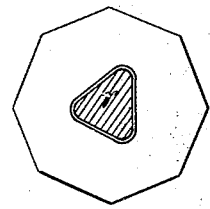

Figure 1 is a sectional perspective view, showing the slaughter-house with the apparatus as arranged therein. Fig. 2 is a sectional plan view of the house, showing the entrance, inclined plane, and elevated pen. Fig. 3 is a vertical section on line $x\ x$ of Fig. 2. Fig. 4 is a vertical section on line $y\ y$ of Fig. 2. Fig. 5 is an elevation in larger size of the suspension-hook. Fig. 6 is a horizontal section through the hook on line $z\ z$ of Fig. 5. Fig. 7 is an elevation in larger size of the hanger for supporting the hook.

The building A is to be of any desired capacity, and is provided upon the floor at one side with a platform, $b$, at the opposite side with an inclined trough, $c$, and the intervening space is sloped to an outlet-opening, $d$, in the center. At one side of the building A is an elevated entrance, $e$, which is to be approached by a gradual inclined plane, and at the inside of the building an inclined plane, $f$, (see Fig. 3,) extends to the elevated pen $g$. At the outer side of the plane $f$ is a close partition, $f'$, that inclines inward from the entrance $e$ to the pen $g$, the side of the building forming the opposite side, so that the entrance to pen $g$ is large enough for one animal only to pass. In the bottom part of partition $f'$ there are fitted swinging or sliding doors $g'$, and the inclined plane $f$ is extended into the building at the side of partition $f'$, so that a workman may stand thereon, and by raising the doors $g'$ have access to the animals in the inclosed space.

In the entrance $e$ is fitted a sliding door, $h$, having attached to it cords or chains $h'$ that extend to the inside of the building, so that the door $h$ can be raised and lowered, as desired.

Within the space inclosed by door $h$ and partition $f$ is a grating or open frame, $i$, one end of which is fitted to slide on rods $i'$, that are attached to the door $h$, and frame $i$ is sustained at its other end by cords $k$, which pass over the pulleys $k'$ to the inside of the building, where they are secured. By these means the grate $i$ can be lowered upon the animals beneath.

In the partition $f$ at the side of the pen $g$ is a sliding door, $l$, adapted for being raised by the operator standing on the platform $l'$. There is also a grated opening, $m$, in the end of the pen $g$, through the side of the building, to admit light for attracting the animals into the pen.

From the ceiling of the building A a track, $n$, is suspended, starting contiguous to the door $l$ of the pen, and continuing around near the sides of the building at a downward inclination to near the starting-point. Upon this track the hangers $o$ are suspended, from which hang the hooks B. The hangers and hooks are shown in larger size in Figs. 5, 6, and 7, and are made in the following manner:

Each hanger $o$ is made with a bent piece, $p$, fitted with the roller $p'$, that rests on the track $n$. On the lower end of the piece $p$ is a U-shaped piece, $q$, formed with ribs $q'$ at its inner side to receive the square-shouldered end of hook B, so that while the hook is suspended it may not turn in its supports. Each hook B is made triangular in its shank portion $r$, and formed with a quick screw-thread. The upper end of the shank $r$ is formed with an angular groove, above which is the square shoulder $r'$. Upon the lower end of the shank $r$ is a tubular piece, $s$, sliding freely on the shank and formed with a projecting tongue, $s'$, that is adapted for entering the slotted point of the hook, and the shank $r$ carries a flanged nut, $t$, which, when screwed down upon the piece $s$, retains the same in place, and the tongue $s'$ clamps the animal's leg in the hook end of hook B.

In the upper part of the building A is a flat pulley, $b'$, guiding the flat band $c'$, that hangs downward contiguous to the platform $l'$. The band $c'$ is connected with suitable elevating apparatus (not shown) driven by competent power, and has upon its lower end a flat hook, $d'$, adapted for hooking into the bent piece $p$ of the hanger $o$. This band $c'$ is for raising the animal from the pen $g$ and placing the hanger $n$ upon the track, and being made flat will not turn on its supports.

The operation of these parts, so far as described, is as follows: The animals are driven up the incline mentioned through the entrance $e$ to the inclined plane $f$, and the door $h$ closed. The grate $i$ is then to be let down upon them for the purpose of urging them toward the pen $g$, and they will pass into the pen one at a time, or as fast as removed from the pen, through the door $l$, the pen $g$ being adapted for holding only one.

The operator upon the platform $l'$ first catches the hook $d'$ of the band $c'$ into one of the hangers $o$, that rest upon the short supporting-track $n'$, then removes the hook B from that hanger, opens the door $l'$, and secures the hook B upon the hind leg of the animal in the pen. He then swings the hanger $o$ from the support $n'$, and secures it upon the hook B, and, by a suitable lever provided for the purpose, sets the power in motion for drawing up the band $c'$ and drawing the animal out. The flap-door $m'$ is opened as the animal comes out, to give more room, and the animal slides smoothly down the trough $u$ until suspended by the band $c'$. When the hanger $o$ has thus been raised above the track $n$ the hook $d'$ of the band $c'$ is between the fixed plates $e'$, which hold the parts in position for the roller of the hanger to take upon the track $n$, while the forward movement of the hanger by gravity releases the flat hook $d'$. The hanger with the animal suspended will run down the track $n$ slowly, and when over the platform $b$ an operator there stationed sticks the animal. Before the animal reaches the end of the track there is time for it to bleed, the blood running to the floor and out by the opening $d$, and when the animal reaches the end of the track it is over the trough $c$, into which it is delivered and slid to the scalding-tanks. The devices for release of the body and manner of operating them are as follows:

The end of track $n$ extends between two rigid hangers, $v$, that carry also the fulcrum of a lever, $v'$, which extends beyond the track $n$, and has suspended from it the two swinging arms $w$. The lower ends of the hangers $v$ are formed with beveled shoulders $w'$ at the inside, upon which the ends of arms $w$ lie when the arms are drawn in between the hangers. The end of each arm $w$ is formed with a socket-plate, $a'$, bent at right angles, and so placed that as they lie on the shoulders $w'$ the nut $t$ of the hook and shoulder of piece $s$ will enter between the plates $a'$, and the bent edges of the plate will embrace the flanges and under side of the nut and the flanges of the sliding piece $s$.

At the other end of lever $v'$ a rope, $b'$, is attached, which rope extends to a convenient position for operation by the workmen below.

As soon as the hook, with the body suspended, reaches the end of the track and the nut is caught by the plates $a'$ the rope $b'$ is to be drawn upon. This action raises the hanger from the track, and with it the hook and body. The body being then suspended by nut $t$, the shank $r$ will revolve in the nut until the hook end is free from the piece $s$, so that the animal is freed and drops into the trough $c$.

At the moment the hanger $o$ is raised from the track $n$, as described, it turns around and its roller stands over the short piece $n'$ of track, and when the animal has dropped the lever $v'$ is to be lowered, which leaves the hanger upon the track $n'$, and returns the arms $w$ to their position on the shoulders $w'$, ready to receive the next hook.

It will be seen that all the apparatus connected with taking the animal from the pen and securing it upon the track are contiguous, and may be easily operated by a single workman on the platform.

This house and apparatus is adapted for the slaughtering business when done on a large scale, and will effect great saving in power and labor.

The number of workmen required will be less than heretofore, and much laborious and brutalizing work will be saved to the workmen.

The hook described is an improvement upon the one shown in Letters Patent granted to me July 12, 1879.

Having thus described my invention, I claim as new and desire to secure by Letters Patent—

1. The flat elevator-band $c'$, having the flat hook $d'$ and working over guide-pulley $b'$, in combination with the hanger $o$, having the bent-piece $p$, to raise the animal from pen $g$, as described.

2. In slaughter-houses, the elevated pen $g$, fitted with the outlet-door $l$, and combined with the inclined plane from the entrance $e$, substantially as and for the purposes set forth.

3. The sliding grating $i$, combined with the inclined plane $f$, leading to the elevated pen, and with the door of the entrance $e$, substantially as and for the purposes specified.

4. In slaughter-houses, the combination, with the elevated track $n$, hangers $o$, and hooks B, of the hangers $v$, formed with shoulders $w'$, lever $v'$, and arms $w$, having socket-plates $a'$, substantially as and for the purposes set forth.

5. The hangers $o$, fitted with the rollers $p'$, and bent plate $q$, formed with ribs $q'$, for receiving the suspension-hooks B, substantially as described and shown.

6. The suspension-hooks B, formed with the threaded shank and fitted with the sliding piece $s$ and nut $t$, substantially as and for the purposes specified.

7. The combination of the elevator-band $c'$, having flat hook $d'$, the hanger $o$, the track $n$, and the fixed guide-plates $e'$, as and for the purpose specified.

JAS. ROBERTSON.

Witnesses:
    GEO. D. WALKER,
    C. SEDGWICK.